United States Patent
Jaekle et al.

[15] 3,661,098
[45] May 9, 1972

[54] APPARATUS FOR SHIPPING AUTOMOBILES

[72] Inventors: William M. Jaekle, 18 Tarry Lane, Orinda, Calif. 94563; Paul V. Garin, 1836 Lake Street, San Francisco, Calif. 94121; William E. Thomford, 1176 Glenwood Drive, Millbrae, Calif. 94030; Wallace M. Greb, 1139 Oakes Boulevard, San Leandro, Calif. 94577; Nicholas N. Udaloff, 141-16th Avenue, San Francisco, Calif. 94107

[22] Filed: Aug. 14, 1969

[21] Appl. No.: 850,107

[52] U.S. Cl. .................... 105/360 R, 105/368 T, 214/119 R
[51] Int. Cl. .................... B60p 3/06, B60p 7/08, B60d 45/00
[58] Field of Search .................... 105/368, 368 R, 368 T; 296/1 A; 248/119, 119 R

[56] References Cited

UNITED STATES PATENTS

| | | | |
|---|---|---|---|
| 1,272,501 | 7/1918 | Moule | 105/368 R |
| 1,340,438 | 5/1920 | Duncan | 105/368 R |
| 1,750,129 | 3/1930 | Romine | 105/368 R |
| 2,129,950 | 9/1938 | Loney | 105/368 R |
| 2,151,431 | 3/1939 | Lord | 105/368 R |
| 2,996,020 | 8/1961 | Udstad | 105/367 |
| 3,182,610 | 5/1965 | Jones | 105/368 R |

OTHER PUBLICATIONS

Southern Pacific Bulletin, July, 1969

*Primary Examiner*—Drayton E. Hoffman
*Attorney*—Mellin, Moore & Weissenberger

[57] ABSTRACT

A railway car has a roof portion, a floor portion and side wall portions. Each side wall portion is made up of a plurality of door portions pivotally fixed relative to the floor portion. The door portions, when pivoted upward, form the side wall portions, with the top edges thereof adjacent the roof portion, and, when pivoted downward, have edges adjacent the ground so that automobiles may be driven thereon. Attaching means are included with the door portions and with the automobiles so that the automobiles may be fixed thereto, with the wheels of the automobiles against the door portions. When the door portions are pivoted upward, the automobiles fixed thereto are carried therewith into the confines of the railway car. Depending on the attaching means used, the automobiles may be either vertically or horizontally fixed to the door portions.

8 Claims, 16 Drawing Figures

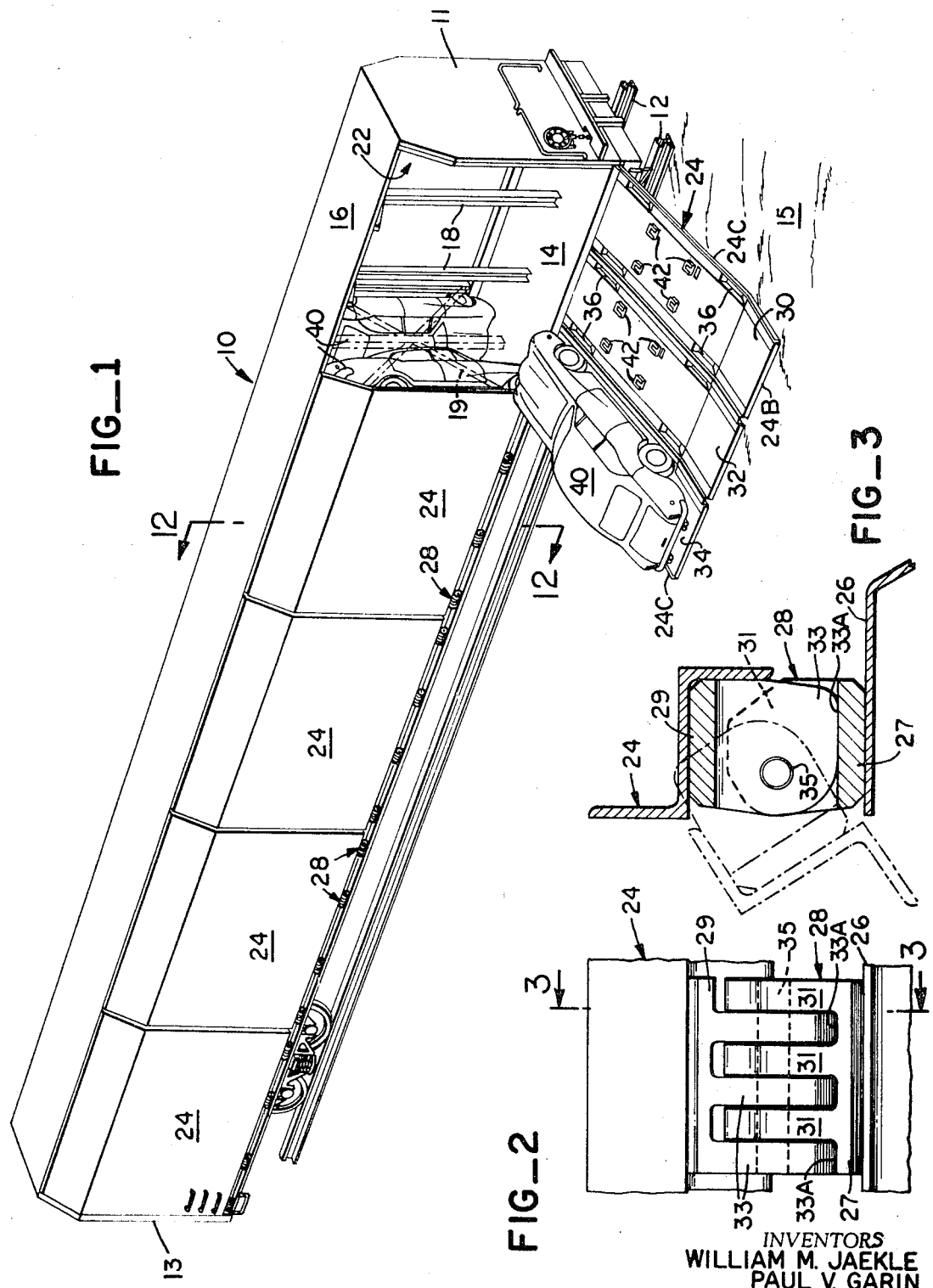

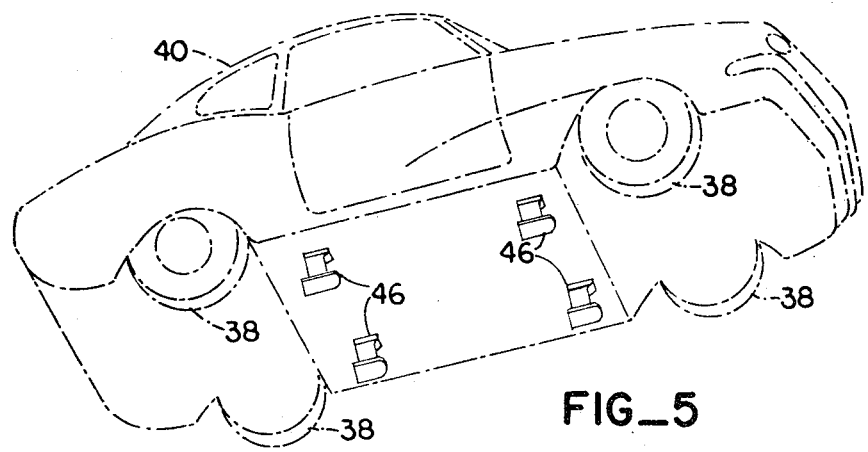
FIG_5
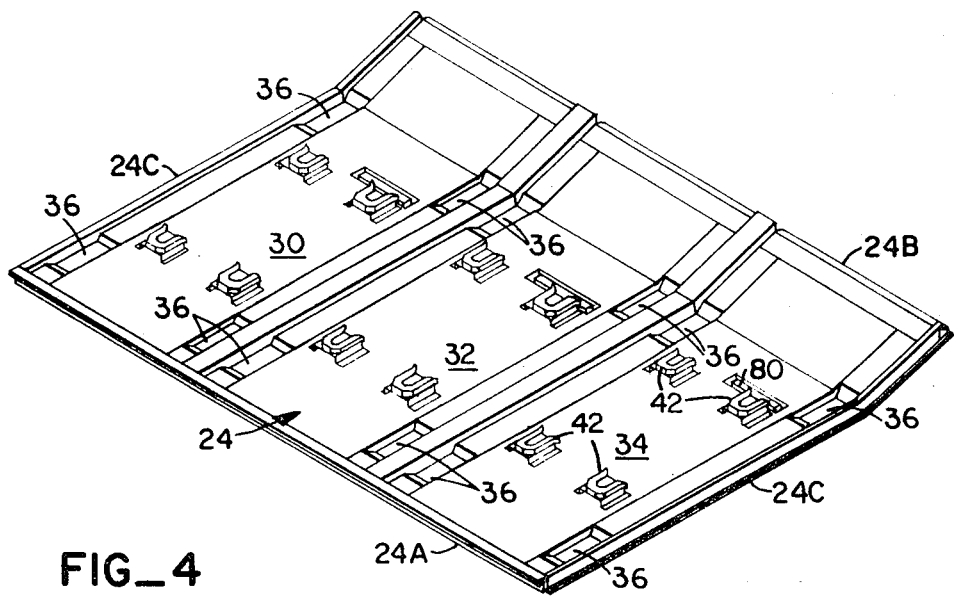
FIG_4

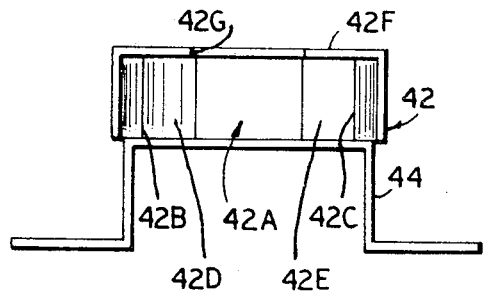
FIG_6
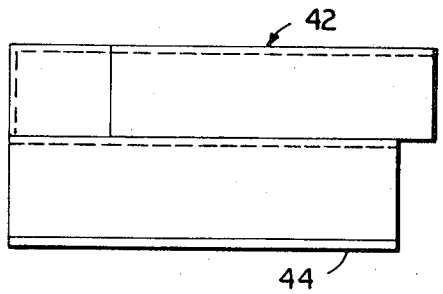
FIG_7
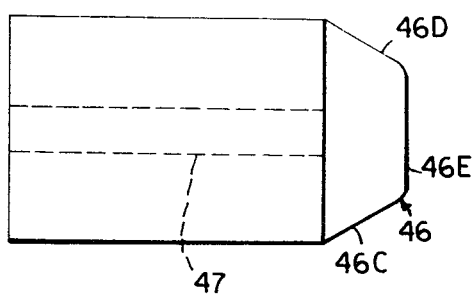
FIG_9
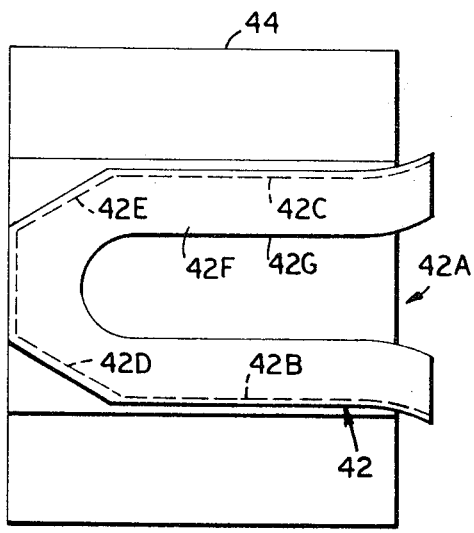
FIG_8
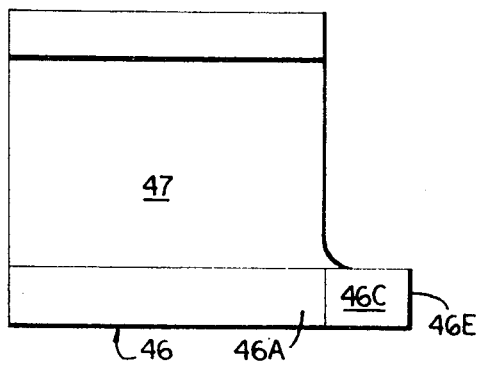
FIG_10
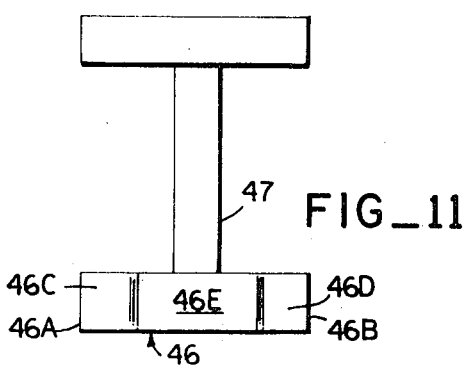
FIG_11
INVENTORS
WILLIAM M. JAEKLE
PAUL V. GARIN
WILLIAM E. THOMFORD
WALLACE M. GREB
NICHOLAS N. UDALOFF

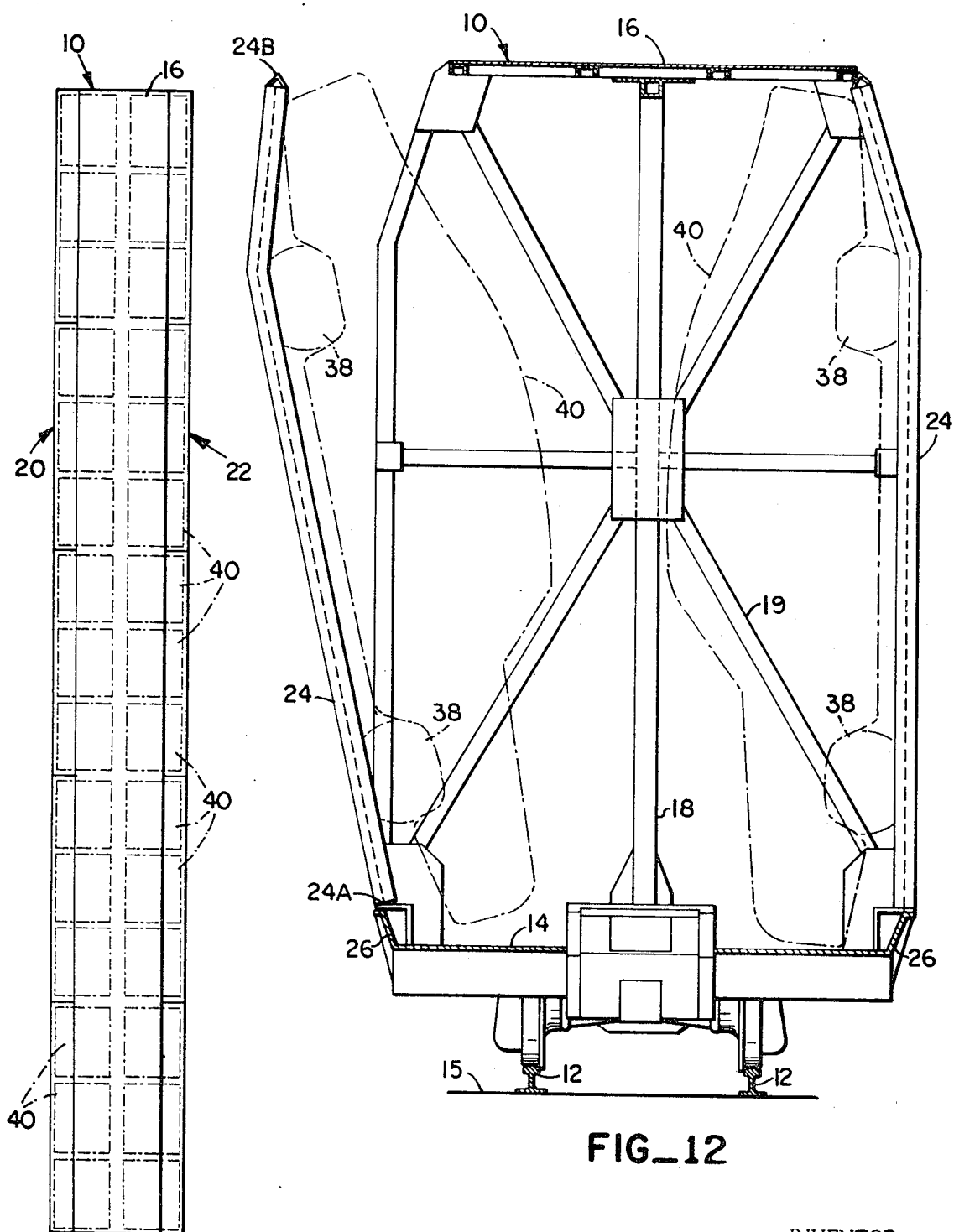

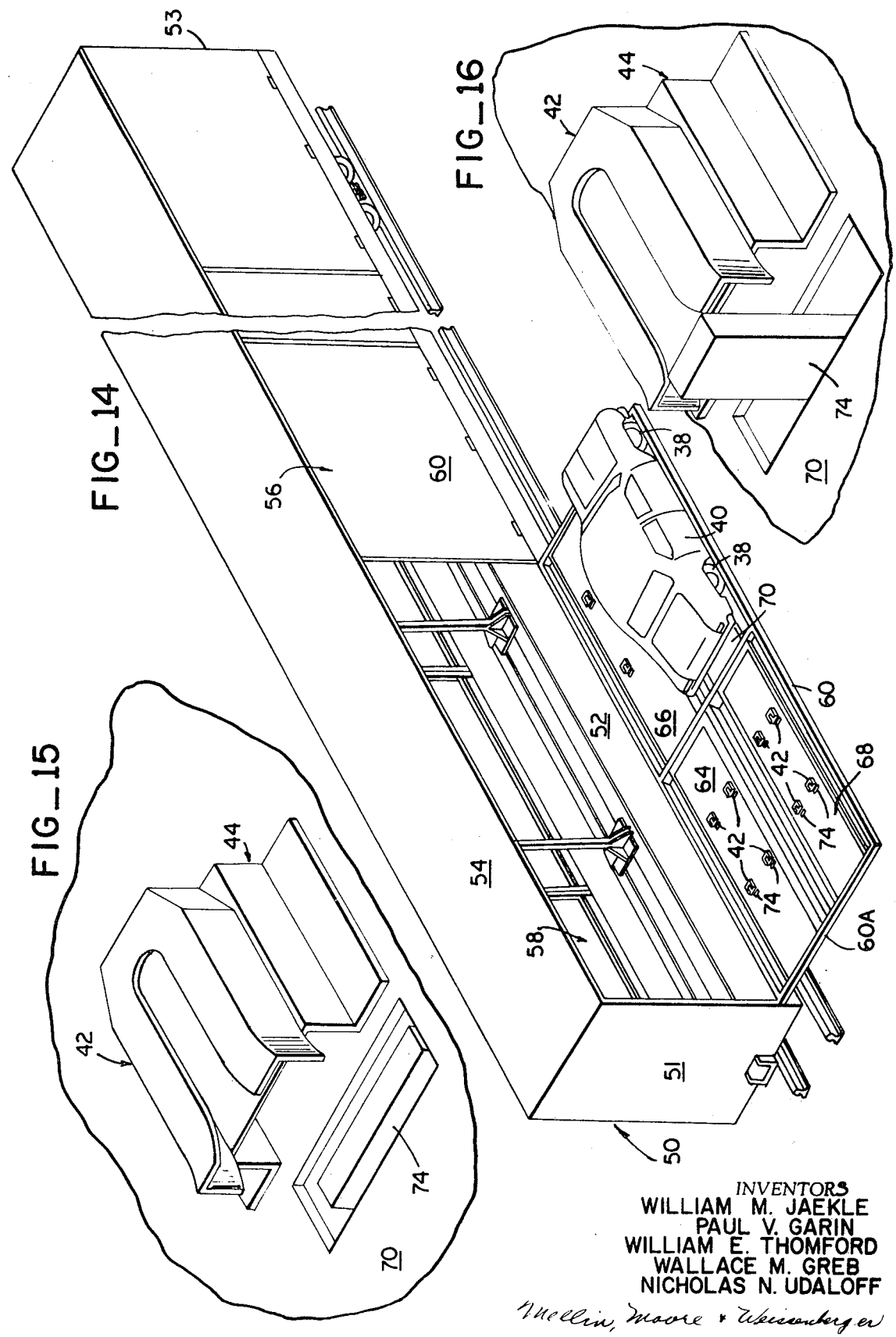

3,661,098

APPARATUS FOR SHIPPING AUTOMOBILES

BACKGROUND OF THE INVENTION

As is well known, the overall dimensions of a railway car, and thus the dimensions of its interior space or "cube," are limited by the dimensions of tunnels, bridges and the like along the line which the railway car must travel. This being so, in order for railroad shipping to be economical, the interior space of a railway car must be used extremely efficiently so that a maximum of interior space is used.

The shipping of automobiles in railway cars creates particular problems. It is, of course, important that a maximum number of automobiles be fitted into the interior space of the railway car, meanwhile being carried in the car in such a manner as to be protected from damage due to outside forces, such as weathering. The relatively large weight of the automobiles makes it relatively difficult to handle, load and unload them in a simple and efficient manner. Meanwhile, the handling and transporting of the automobiles must be done in a manner which does not damage them.

Various railway cars designed for shipping automobiles are known. See, for example, U.S. Pat. Nos. 1,272,501 (Moule), 1,994,695 (Dolan et al.) and 3,182,610 (Jones). A study of these patents reveals, however, that none teaches a structure which overcomes these problems. In Moule, the interior space of the railway car is used relatively inefficiently, resulting in only a relatively few cars being carried by the railway car. While the interior space of Dolan et al. is used more efficiently than that in Moule, such efficiency is not maximized by any means. Moreover, Dolan et al. do not disclose a simple and efficient way to load, unload and generally handle the automobiles. Rather, they disclose the partial disassembly of the automobiles in conjunction with a complicated support structure. In Jones, the "interior" space of the railway car is left open, there being no roof portion on the car, so that the automobiles being carried and shipped are not protected from damage due to outside forces.

Various railway cars designed for shipping automobile bodies only are also known. See, for example, U.S. Pat. Nos. 1,418,634 (Fife), 1,788,667 (Friedlaender), and 2,996,020 (Udstad). While the interior space of each of these structures is used relatively efficiently in carrying automobile bodies, the problems involved in achieving such packing are quite different. For example, the automobile bodies shown are of smaller overall dimensions than the complete car, making them much easier to handle. Because of this, none of these patents is greatly concerned with means for loading and unloading the automobile body. This, of course, is a quite critical problem in the loading and unloading of complete automobiles. Second, such bodies, containing no running gear, are of course much lighter than the complete cars, and therefore easier to load and unload. Third, because of such light weight, that portion of the structure which supports the body weight need not be nearly as strong as if it was to support the complete car.

It is an object of this invention to provide apparatus for transporting automobiles, such apparatus including railway cars which utilize the interior space thereof in an extremely efficient manner.

It is a further object of this invention to provide apparatus which, while fulfilling the above object, provides protection from outside forces to the automobiles within the railway car.

It is a still further object of this invention to provide apparatus which, while fulfilling the above objects, provides means for easily and conveniently loading and unloading the automobiles into and from the railway cars.

It is a still further object of this invention to provide apparatus which, while fulfilling the above objects, does not damage the automobiles during loading, transporting, or unloading thereof.

It is a still further object of this invention to provide apparatus which, while fulfilling the above objects, is extremely simple, strong and efficient, and requires a minimum of maintenance.

SUMMARY OF THE INVENTION

Broadly stated, the inventive apparatus for transporting automobiles comprises a railway car having a floor portion, a roof portion, and first and second side wall portions interconnecting the floor portion and roof portion. Each side wall portion comprises a plurality of door portions, each pivotally fixed adjacent its bottom edge relative to the floor portion so as to be upwardly and downwardly pivotal relative to the floor portion. The door portions together, when pivoted upwardly, form at least a part of the first side wall portion, and at least a part of the second side wall portion with the top edges of the door portions adjacent the roof portion. Means are associated with each door portion and each automobile for supporting the automobile with its wheels against the door portion and with its axis vertical or horizontal. Such means support the automobiles within the railway car above the floor portion and below the roof portion when the door portions form part of the first wall portion and part of the second wall portion.

BRIEF DESCRIPTION OF THE DRAWINGS

These and other objects of the invention will become apparent from a study of the following specification and drawings, in which:

FIG. 1 is a perspective view of a first embodiment of the apparatus;

FIG. 2 is an enlarged elevational view of a hinge portion of the apparatus;

FIG. 3 is a sectional view taken along the line 3—3 of FIG. 2;

FIG. 4 is a perspective view of a door portion of the apparatus;

FIG. 5 is a perspective view of an automobile to be transported by the apparatus;

FIG. 6 is a front elevation of a receiver as mounted to the door portion of FIG. 4;

FIG. 7 is a side elevation of the receiver of FIG. 6;

FIG. 8 is a plan view of the receiver of FIGS. 6 and 7;

FIG. 9 is a plan view of a shoe as fixed to the bottom of the automobile of FIG. 5;

FIG. 10 is a side elevation of the shoe of FIG. 9;

FIG. 11 is a front elevation of the shoe of FIGS. 9 and 10;

FIG. 12 is a sectional view taken along the line 12—12 of FIG. 1;

FIG. 13 is a plan view of the first embodiment of the apparatus, shown fully loaded with automobiles;

FIG. 14 is a perspective view of a second embodiment of the apparatus;

FIGS. 15 and 16 are perspective views of the means associated with the second embodiment of the invention for fixing the automobiles to the door portions of the apparatus, in unlocked and locked positions.

DESCRIPTION OF THE PREFERRED EMBODIMENTS

Shown generally in FIG. 1 is a first embodiment of railway car 10, designed to be transported over rails 12 over the ground 15. Such railway car includes a horizontal floor portion 14, and a roof portion 16, with brace members 18 and 19 running therebetween. End walls 11, 13 are included at the ends of the car 10. Side wall portions 20, 22 interconnect the floor portion 14 and roof portion 16. These side wall portions 20, 22 are each made up of a plurality of door portions 24. Each door portion 24 is associated with the floor portion 14 by means best shown in FIGS. 2, 3 and 12.

As shown therein, floor portion 14 has side sills 26 extending upwardly and outwardly therefrom. The bottom edge 24A of each door portion 24 is pivotally fixed to a sill 26 by means of a hinge 28. Each hinge 28 includes a hinge portion 27 fixed to the sill 26, and a hinge portion 29 fixed to the door portion 24. Hinge portion 27 defines projections 31, which mate with projections 33 of hinge portion 29, and a pin 35 is disposed through these projections 31, 33, acting as a hinge pin 35. Each door portion 24, it will be seen, is pivotal upwardly and downwardly relative to floor portion 14. When a door portion 24 is pivoted downwardly, the pin 35 takes the load of the door 24, and any load fixed thereto (shown in phantom in FIG. 3). However, the projections 33, it will be seen, are cam-shaped, and when the door portion 24 is pivoted upwardly to its upward position, the ends 33A of projections 33 contact the recesses between the projections 31, so that the load is taken off the pin 35, and is taken directly through hinge portions 27, 29.

When these door portions 24 are pivoted upwardly, they form the side wall portions 20, 22 of the railway car 10, with the top edges 24B of the door portions adjacent and along the edges of the roof portion 16. When the door portions 29 are so pivoted upwardly, the floor portion 14, roof portion 16, end walls 11, 13, and side wall portions 20, 22 together define a completely enclosed interior. (It will be understood, of course, that locking means are associated with the top edge 24B of each door 24 and the roof portion 16 and with the side edges 24C and brace members 19 to selectively hold the door portions 24 in their upward positions.) When these door portions 24 are pivoted downwardly, the top edges 24B thereof are positioned adjacent the ground 15, or other loading surface.

The configuration of a door portion 24 and its associated structure is shown in detail in FIGS. 4 and 6–8. The door portion 24 is made up of sections 30, 32, 34. These sections 30, 32, 34 each have a plurality of wheel wells 36, which are positioned to receive the wheels 38 of an automobile 40 (FIG. 5) positioned thereon. That is, an automobile 40 may be positioned on sections 30, 32, or 34, with its wheels 38 positioned in the wheel wells 36 of that section.

Fixed to each section 30, 32, 34 are four receivers 42. These receivers are on pedestals 44, and have large open ends 42A positioned toward edge 24B of door portion 24. Each receiver 42 has generally parallel side portions 42B, 42C which lead into inwardly tapered portions 42D, 42E. A retainer flange 42F is included at the top surface of each receiver, and defines a slot 42G.

On the underside of automobile 40 are four shoes 46, each mounted on a bar 47. Each shoe 46 defines generally parallel side surface portions 46A, 46B, which lead into inwardly tapered surface portions 46C, 46D, ending in a nose portion 46E.

In the use of such apparatus, a door portion 24 of the empty railway car 10 is pivoted downward through hinges 28 until edge 24B thereof is adjacent the ground 15 (FIG. 1). An automobile 40 is then driven over edge 24B and onto section 34, until its wheels 38 rest in wheel wells 36. The wheel wells 36, receivers 42, and shoes 46 are positioned so that when the wheels 38 are in the wheel wells 36, each shoe 46 cooperates with a receiver 42 so that the nose portion 46E of a shoe 46 protrudes to a small extent into the large open end 42A of a receiver 42.

Other automobiles are then driven onto sections 30, 32 of the door portion 24. The door portion 24 is then pivoted upwardly (by means not shown). As this is done, under the weight of each automobile 40, the shoes 46 are forced down into the receivers 42. The surfaces 46C, 46D seat against tapered portions 42D, 42E, holding the automobile 40 from moving laterally and downwardly. Moreover, flange 42F holds the shoe 42 associated therewith from moving away from the door portion. In this way, each automobile 40 is secured to the door portion 24.

Door portion 24 is pivoted upwardly to become part of side wall portion 20, and the top edge 24B and side edges 24C are locked in place. The other door portions 24 are used in the same way, and through such means the automobiles 40 are fixed to and supported by the door portions 24 within the railway car 10. When so supported, the automobiles 40 are positioned above the floor portion 14 and below the roof portion 16, and have their longitudinal axes perpendicular to the horizontal plane of the floor portion.

For a given railway car 10 of this size, it has been found that if 18 automobiles could be transported fully enclosed therewithin when positioned with their wheels downward, 30 automobiles can be transported fully enclosed within the car 10 in such vertical manner (FIG. 13).

Unloading of the automobiles 40 after they have been transported is, of course, the reverse of the above-described process.

Shown generally in FIGS. 14, 15 and 16 is a second embodiment of railway car 50. Such railway car 50 also includes a horizontal floor portion 52, a roof portion 54, end walls 51, 53, and side wall portions 56, 58. These side wall portions 56, 58 are each made up of a plurality of door portions 60, which are pivotally fixed relative to floor portion 52 by the hinge means shown in FIGS. 2 and 3. These door portions 60 are thus pivotal upwardly to form side wall portions 56, 58 with the top edges thereof adjacent the roof portion 54, and are pivotal downwardly until edges 60A thereof are positioned adjacent the ground 15.

Each door portion 60 is made up of sections 64, 66, 68, 70 which are of such size as to receive an automobile 40 thereon. Each section has four receivers 42 mounted on pedestals 44 fixed thereto, and pivotal arms 74 associated with these receivers 42.

In loading an empty railway car 50, a door portion 60 is pivoted downward until edge 60A is adjacent the ground 15. An automobile 40 is then driven over edge 60A, a loading ramp being fitted, if necessary, over section 68, and onto section 70. Each receiver 42 on the door portion 60 receives a shoe 46. When the automobile 40 is so positioned, arms 74 are pivoted to the point shown in FIG. 16, whereby the shoes 46 are held within the re-ceivers 42.

Other automobiles 40 are driven onto sections 64, 66, 68 and fixed to door portion 60. The door portion 60 is then pivoted upwardly and locked in position. When such is done, each automobile 40 is supported in a position with its longitudinal axis parallel to the horizontal plane of the floor portion 52 completely within the car 50, with its wheels 38 against the door portion 60, above the floor portion 52, and below the roof portion 54.

The other door portions 60 are, of course, used in the same way. For a given railway car 50 of this size, if 16 automobiles of a certain size could be transported therewithin when positioned with their wheels downward, 20 automobiles of that certain size can be transported fully enclosed therewithin in this new manner.

In the first-described embodiment, it may be advantageous to include a pivotal arm 80, similar to pivotal arm 74, in association with one of every set of four receivers 42. This is shown in FIG. 4. Such pivotal arm 80 may be pivoted upwardly to selectively hold the shoe 46 associated therewith within the receiver 42. Such pivotal arm 80 acts as a retainer in ensuring that the automobile 40 is securely held to the door portion 24.

It will be understood that in either embodiment the number of automobiles to be fixed to any given door portion can be varied, by changing the design of each door portion. It will also be understood that the automobiles need not be driven on and off the doors when loading and unloading but may be moved by other means.

In either embodiment, the wheels of each automobile are against the door portions of the railway car. Because of this, there need be no protective material between the door portions and the automobiles (such as would be necessary, for example, if the automobiles were positioned with their roofs adjacent the door portions). The wheels themselves act as protective material.

It will be seen that herein are provided means for transporting automobiles, such means including railway cars which utilize the interior space thereof in an extremely efficient manner. In both embodiments, the automobiles are fully enclosed for protection when being transported. The automobiles can be loaded into and unloaded from either embodiment of railway car easily and conveniently, and without damage thereto. Both embodiments of apparatus, it will be seen, are extremely simple and efficient, and require a minimum of maintenance.

Having thus described our invention, we claim:
1. Apparatus for transporting automobiles comprising:
   a. a railway car having a floor portion, a roof portion, and wall portions, at least one wall portion comprising a door pivotally fixed adjacent one edge thereof relative to the floor portion, such door being pivotal to a position wherein it forms part of that wall portion with another edge thereof adjacent the roof portion;
   b. a wheeled vehicle having a frame;
   c. a plurality of attachment means for securing said vehicle to said door, each of which attachment means includes a first member fixed to said door and a second member fixed to said vehicle frame, said first members being engageable with said second members by movement of said vehicle on said door in a direction other than away from said one edge thereof, and disengageable by movement of said vehicle on said door in an opposite direction from that causing engagement, said first and second members being fixed to said door and said vehicle frame at all times during said engagement and disengagement,
   d. said attachment means members having interengageable means thereon for positively restraining movement of said vehicle frame towards said one edge portion of said door when said members are engaged;
   e. said attachment means members having interengageable means thereon for holding said vehicle frame at a fixed distance spaced from said door and for positively restaining movement of said vehicle frame towards and away from said door when said members are engaged;
   f. said first members being located on said door and said second members being located on said vehicle frame such that the vehicle is entirely spaced from the floor of said car when said members are engaged and said door is pivoted to the position where it forms part of said wall portion.

2. Apparatus as set forth in claim 1 wherein said vehicle has its wheels against said door when said attachment means members are engaged.

3. Apparatus as set forth in claim 1, wherein all of said attachment means are simultaneously engageable and disengageable.

4. Apparatus as set forth in claim 1, wherein said attachment means members are engageable by movement of said vehicle on said door in a direction towards said one edge thereof.

5. Apparatus as set forth in claim 1, wherein said attachment means are engageable by movement of said vehicle on said door in a direction parallel to said one edge thereof.

6. Apparatus as set forth in claim 1, wherein one member of each of said attachment means comprises a shoe and the other member comprises a hollow receiver having an interior configuration of the shape of said shoe, said receiver having an open end to permit insertion of said shoe into said receiver, and said shoe and receiver having surfaces thereon engaged with each other when said shoe has been inserted into said receiver to prevent movement of said shoe in any direction relative to said receiver other than out said open end thereof.

7. Apparatus as set forth in claim 6, wherein said shoe is inserted into said receiver by movement of said vehicle on said door in a direction towards said one edge of said door.

8. Apparatus as set forth in claim 6, wherein said shoe is inserted into said receiver by movement of said vehicle on said door in a direction parallel to said one edge of said door.

* * * * *